United States Patent [19]
Ori

[11] Patent Number: 6,147,816
[45] Date of Patent: Nov. 14, 2000

[54] IMAGE-READING LENS

[75] Inventor: Tetsuya Ori, Kawaguchi, Japan

[73] Assignee: Fuji Photo Optical Co., Ltd., Omiya, Japan

[21] Appl. No.: 09/397,670

[22] Filed: Sep. 16, 1999

[30] Foreign Application Priority Data

Sep. 17, 1998 [JP] Japan .................................. 10-262751

[51] Int. Cl.$^7$ ...................................................... G02B 9/06
[52] U.S. Cl. .......................... 359/794; 359/784; 359/790; 359/565
[58] Field of Search ..................................... 359/784, 785, 359/789, 790, 791, 792, 793, 794, 795, 565

[56] References Cited

U.S. PATENT DOCUMENTS

| 5,754,340 | 5/1998 | Ushida et al. | 359/566 |
| 5,768,030 | 6/1998 | Estelle et al. | 359/784 |
| 5,880,879 | 3/1999 | Foo . | |
| 6,028,711 | 2/2000 | Adachi | 359/784 |

Primary Examiner—Scott J. Sugarman
Attorney, Agent, or Firm—Arnold International; Bruce Y. Arnold

[57] ABSTRACT

An image-reading lens is formed of a two lens elements of meniscus shape, one with its convex surface on the most object-side of the image-reading lens and one with its convex surface on the most image-side of the image-reading lens. An intermediate lens element of negative refractive power may be optionally provided. A zone plate diffractive optical surface having different depth zones surrounding a vertex is formed on at least one aspherical surface of the two lens elements of meniscus shape so as to correct simltaneously for both lateral color and curvature of field. Another surface, preferably of the same lens element having the zone plate diffractive/aspherical surface, is made aspherical. Of the two lens elements of meniscus shape, one is made of plastic material and the other is made of non-plastic material. The image reading lens provides a high image quality having a small temperature dependence, despite one lens element thereof being made of plastic material. Unlike prior art image-reading lenses employing only two or three lens elements, the image-reading lens of the present invention can be used with a broadband light source.

8 Claims, 7 Drawing Sheets

IMAGE-READING LENS

BACKGROUND OF THE INVENTION

In an image-reading lens used for a facsimile machine, an image scanner, or the like which forms reduced or enlarged original images on an imaging element, it is required to minimize aberrations, particularly the lateral color and the curvature of field. In addition, reduced weight and price are also desired, and it is expected that the number of lens elements will be reduced to as few as possible. Further, it is required that a lens material be used that has ease of processing for mass-production.

As an image-reading lens satisfying the above-noted properties and having a simple configuration, a triplet-type glass lens has recently become dominant. However, the lens is expensive; thus, there has been a demand for a lens having lower manufacturing costs and better performance. Since a light-weight lens is also in demand, an image-reading lens having two lens elements and including an aspherical surface has been recently proposed. However, although such an image-reading lens is lighter and cheaper than a triplet-type design, there are some problems with its properties.

First, in the case of an image-reading lens having only two lens elements, it is difficult to simultaneously correct the curvature of field and lateral color. In order to correct the curvature of field, it is necessary to use a nitric material with a refractive index so as to reduce the Petzval sum. On the other hand, in order to correct lateral color, it is necessary to use a nitric material having a large Abbe constant for a convex lens element In a two lens element image-reading lens, it is difficult to select a nitric material which can minimize the curvature of field and at the same time minimize the lateral color. And, such nitric materials as are suitable are extremely expensive and not very durable. As a result, a recently proposed two lens element image-reading lens is suitable only if the light from the light source is nearly monochromatic. Even if such a two lens element image-reading lens can be made sufficiently durable, the correction of both aberrations win inevitably become inadequate as the light becomes more polychromatic.

Regarding the selection of lens materials, it is generally preferable to use plastic in order to reduce the weight of the lens and to minimize cost. Since an aspherical surface is used in the two lens element image-reading lens, plastic is advantageous for processing. However, plastic depends heavily on temperature, so that there is the problem in that a two lens element image-reading lens of plastic has unstable properties. Considering only temperature dependency, glass may be used as the material of the lens elements; however, the use of glass precludes reducing the weight and cost of the image-reading lens.

BRIEF SUMMARY OF THE INVENTION

The present invention is an image-reading lens for reducing or enlarging images in an optical system of an image-reading apparatus, such as a facsimile or an image scanner, that uses broadband radiation such as white light as an illuminating light. A first object of the invention is to provide an image-reading lens that simultaneously corrects both curvature of field and lateral color. A second object of the invention is to decrease the cost of the lens by making lower cost materials suitable as a type of material that can be used to form the lens. A third object of the invention is to simplify the lens element configuration.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The present invention is an image-reading lens, formed of a plurality of lens elements, for reading an original image using light from a broadband light source wherein at least one surface of the plurality of lens elements is aspherical and includes a zone plate diffractive optical surface having high color dispersion properties. In several embodiments, the image-reading lens of the present invention has only two lens elements that have refractive power; however, the invention also encompasses an image-reading lens three lens elements that have refractive power. The image-reading lens includes, in order from the object side, a first lens element of a meniscus shape with its convex surface on the object side, and a second lens element of a meniscus shape with its convex surface on the image side. At least one surface of the first lens element and the second lens element is aspherical and includes a zone-plate diffractive optical element (DOE) having high color dispersion that exceeds the color dispersion of a refractive surface of glass or plastic by an order of magnitude. Moreover, it is preferred that only one of the first lens element and the second lens element be made of plastic and that the image-reading lens satisfies the following condition (1):

$$0.7 < f/fa < 1.3 \qquad \text{Condition (1)}$$

where
  fa is the focal length of the lens element made of nonplastic material, and
  f is the focal length of the image-reading lens.

It is also preferred that at least the zone plate diffractive/aspherical optical surface be formed on the lens element made of plastic.

Several embodiments of the present invention are given below, with reference to the drawings. Although Embodiment 1 will be described in detail, redundant explanations for each of the other embodiments will be omitted. Additionally, Embodiments 2–4 are so similar in appearance to Embodiment 1 that separate figures showing the lens element configuration for these embodiments have been omitted. For the details of the lens element construction, Tables have instead been provided for each embodiment.

Embodiment 1

Figure 1:
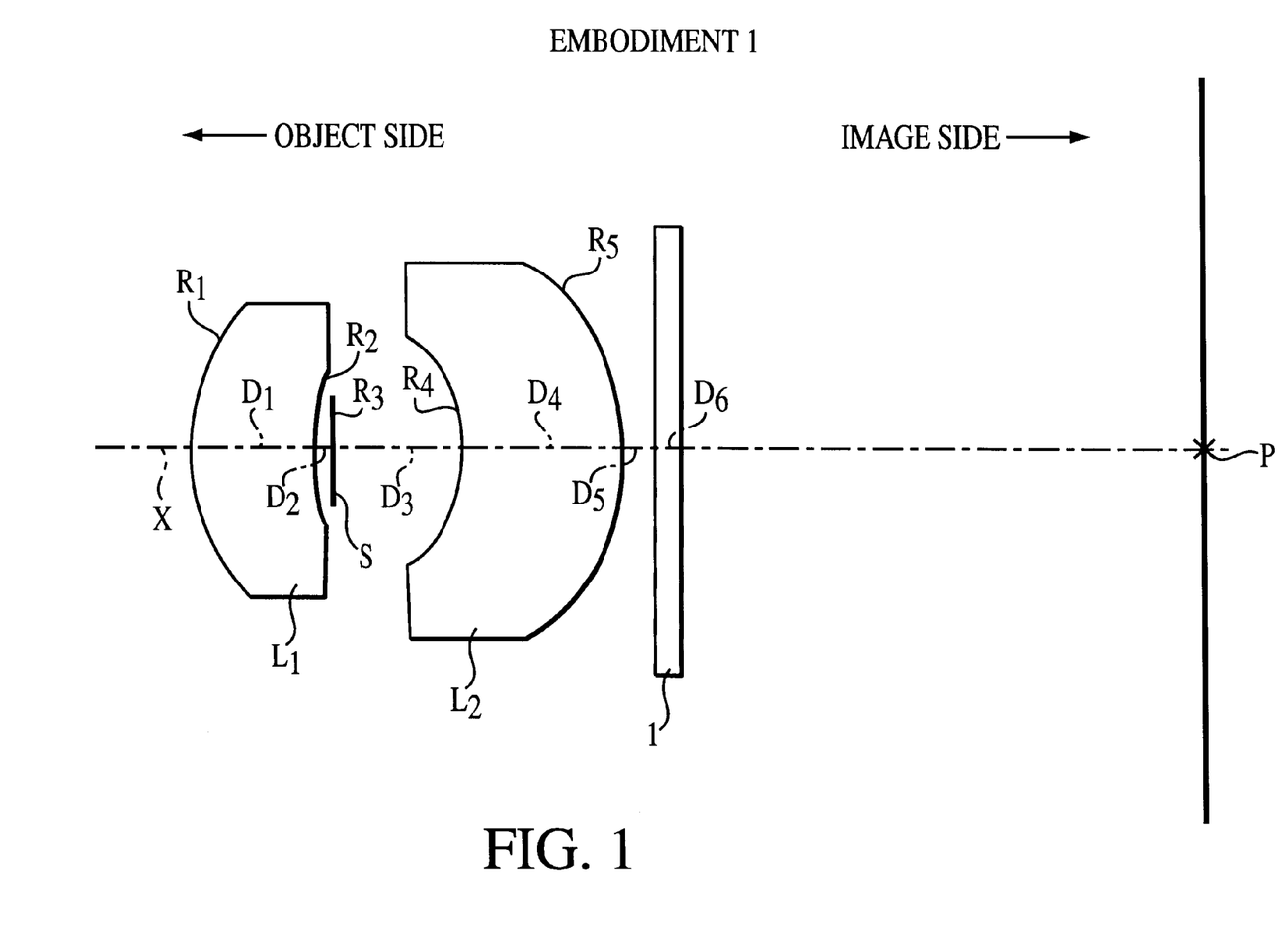
FIG. 1 shows the basic lens element configuration of the image-reading lens of Embodiment 1, and for Embodiments 2–4 as well, due to similarity in appearance of these embodiments.
Figure 2A:
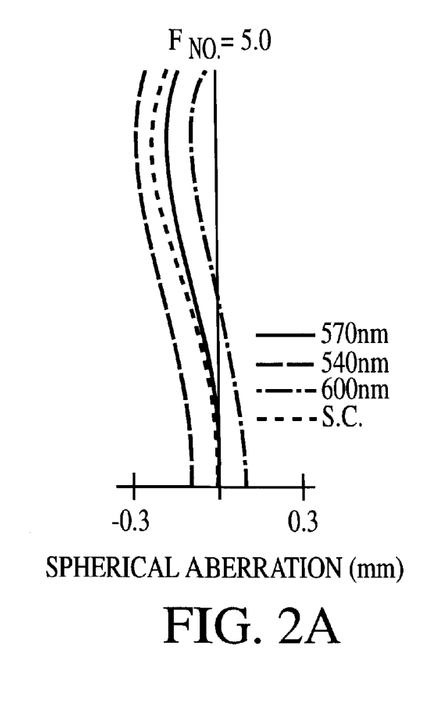
FIGS. 2A–2D show various aberration curves of the image-reading lens of Embodiment 1.
Figure 2B:
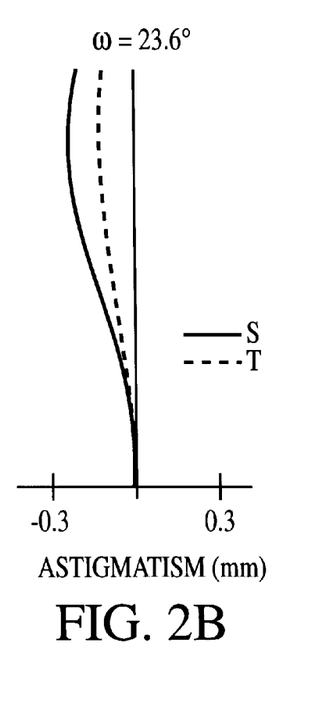
Figure 2C:
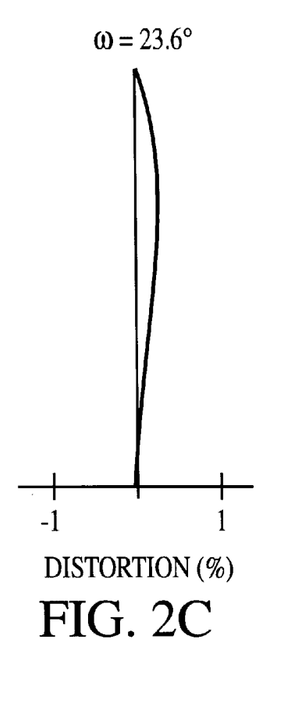
Figure 2D:
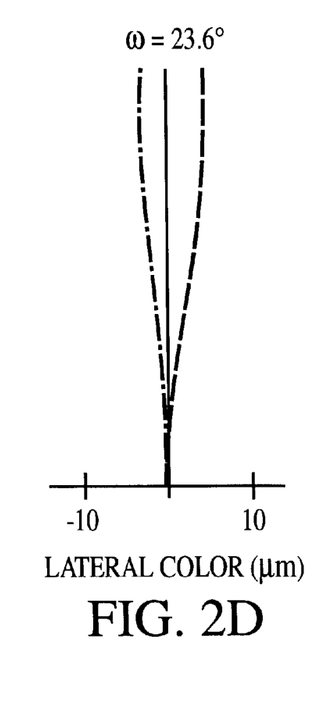
Figure 3A:
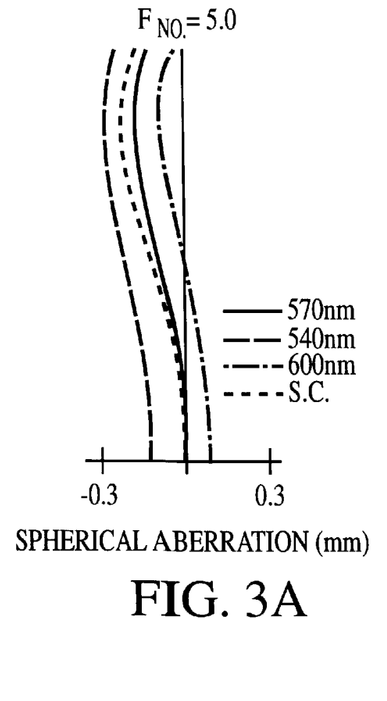
FIGS. 3A–3D show various aberration curves of the image-reading lens of Embodiment 2.
Figure 3B:
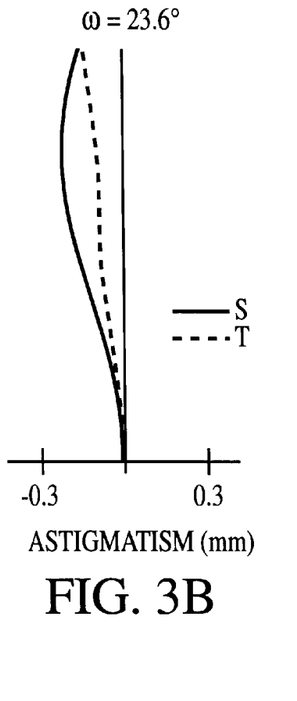
Figure 3C:
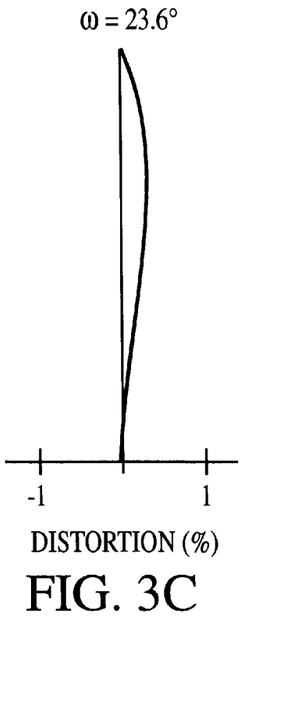
Figure 3D:
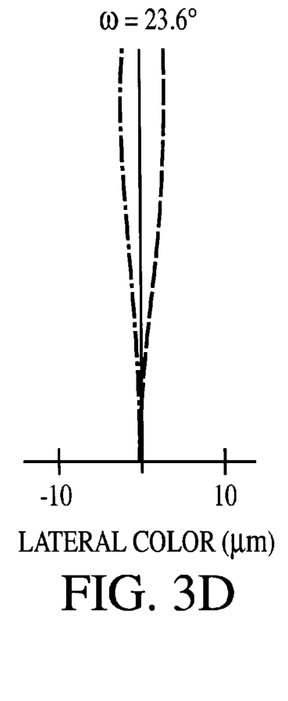
Figures 4A, 4B:
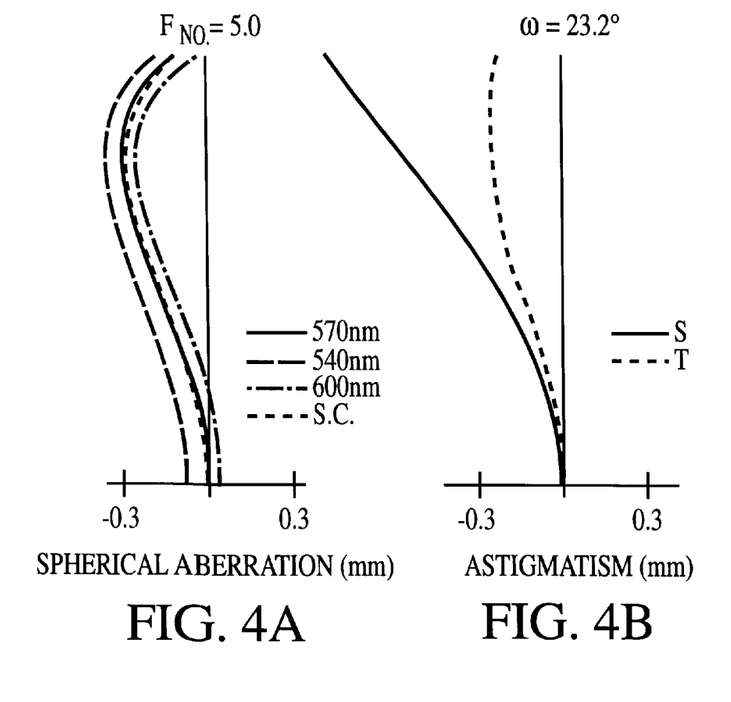
FIGS. 4A–4D show various aberration curves of the image-reading lens of Embodiment 3.
Figure 4C:
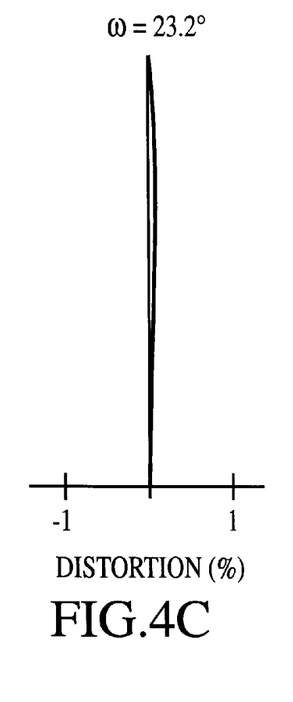
Figure 4D:
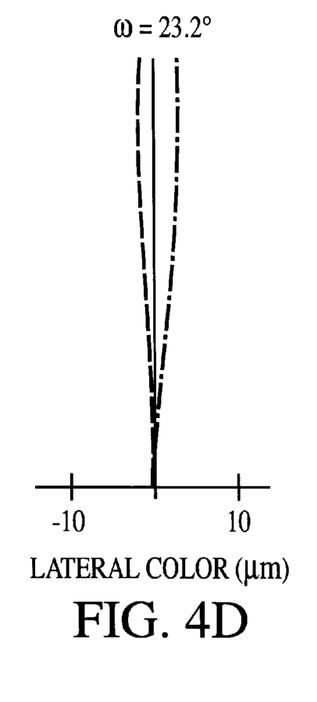
Figures 5A, 5B:
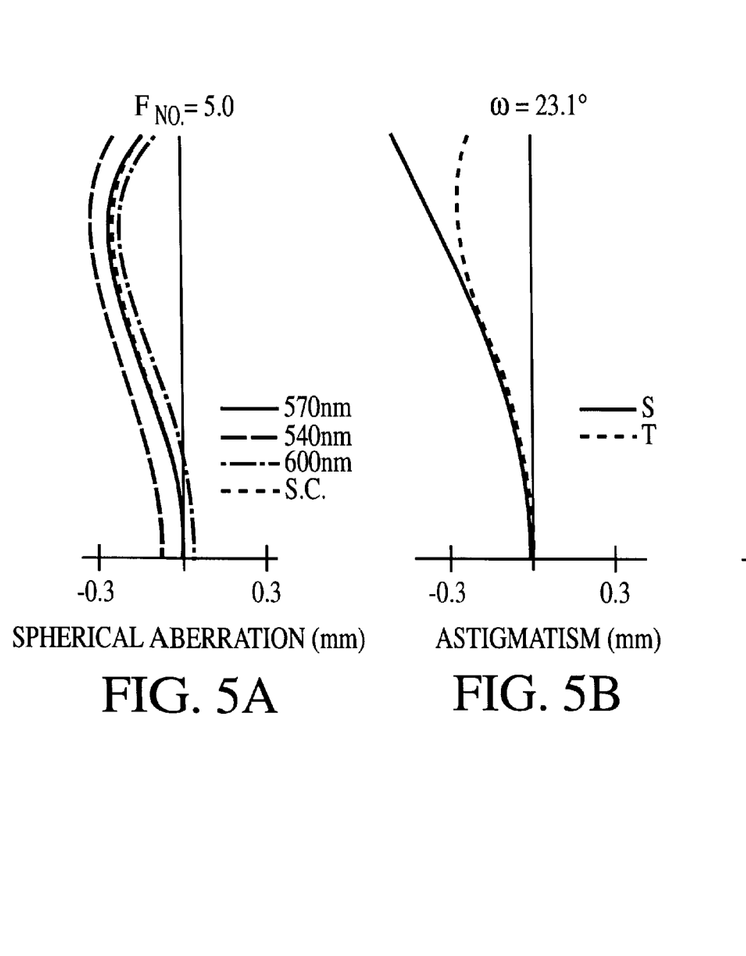
FIGS. 5A–5D show various aberration curves of the image-reading lens of Embodiment 4.
Figure 5C:
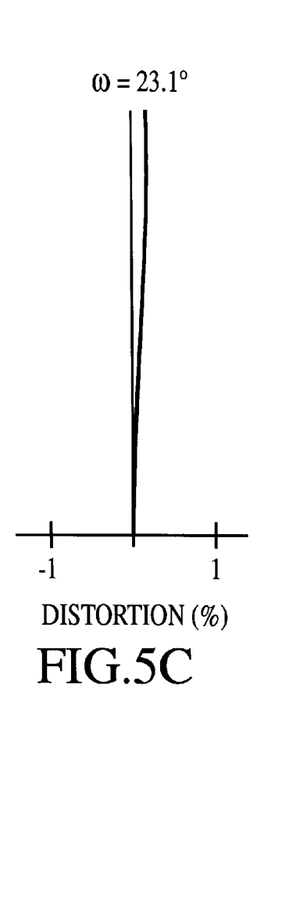
Figure 5D:
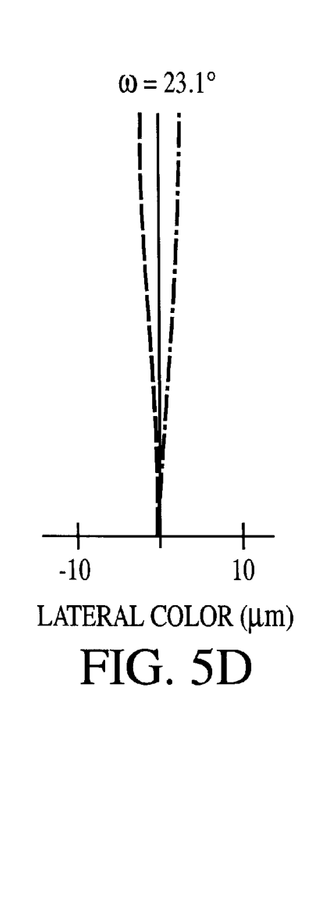

FIG. 1 shows the basic lens element configuration of Embodiment 1 of the present invention. The image-reading lens of this embodiment has two lens groups, with each lens group formed of a single lens element. In order from the object side, the image-reading lens is formed of a first lens element $L_1$ of a positive meniscus shape with its convex surface on the object side, and a second lens element $L_2$ of negative meniscus shape with its convex surface on the image side. At least one surface of these lens elements is a DOE surface.

In Embodiment 1, the surface at the object side of the second lens element $L_2$ is aspherical and includes a zone plate structure formed thereon, and the surface at the image side of the second lens element $L_2$ is a aspherical, with $L_2$ being formed of plastic material A diaphragm S is positioned between the first lens element $L_1$ and the second lens element $L_2$. A cover glass 1 is positioned on the image-side of the second lens element $L_2$. Moreover, X in FIG. 1 is the optical axis.

The zone plate diffractive/aspherical optical surface of the second lens element $L_2$ has a shape defined by the Equation (1) below, the first portion (ie., the bracketed product) defining the phase function of the zone plate and the second portion defining the shape of the aspherical surface on which the zone plate is formed:

$$Z=[B_1Y^2+(B_2Y^4-2\pi)+(B_3Y^6-4\pi)+(B_4Y^8-6\pi)+(B_5Y^{10}-8\pi)][\lambda/2\pi(N-1)]+[CY^2/\{1+(1-KC^2Y^2)^{1/2}\}+A_4Y^4+A_6Y^6+A_8Y^8+A_{10}Y^{10}] \quad \text{Eq. (1)}$$

where

Z is the length (in mm) of a line drawn from a point on the zone plate diffractive/aspherical surface at distance Y from the optical axis to the tangential plane of the zone plate diffractive/aspherical surface vertex, $B_1$, $B_2$, $B_3$, $B_4$ and $B_5$ are coefficients for the phase function for the first through fifth zones, Y is the distance (in mm) from the optical axis, $\lambda$ is the design wavelength, N is the lens element index of refraction at the design wavelength, C (=1/R) is the curvature of the aspherical source near the optical axis, K is the eccentricity of the aspherical surface, and $A_4$, $A_6$, $A_8$, and $A_{10}$ are the aspherical coefficients.

The aspherical surface of the second lens element $L_2$ has a shape defined simply by the second term of the above equation, ie., by the following Equation (2)

$$Z=CY^2/\{1+(1-KC^2Y^2)^{1/2}\}+A_4Y^4+A_6Y^6+A_8Y^8+A_{10}Y^{10} \quad \text{Eq. (2)}$$

where

Z is the length (in mm) of a line drawn from a point on the aspherical surface at distance Y from the optical axis to the tangential plane of the aspherical surface vertex, and Y, C, K and $A_4$, $A_6$, $A_8$ and $A_{10}$ are as defined above.

The operational effects of applying an optical system having a DOE surface will now be described. A DOE has unique properties which are not found in an optical system using conventional refraction. One of the properties is the ability to provide much more dispersion than a conventional refraction optical system. While the dispersion (1/v) of normal glass is given by $v=(N_1-1)/(N_2-N_3)$, the dispersion (1/v) of a DOE is given by $v=\lambda_1/(\lambda_2-\lambda_3)$. The wavelengths $\lambda_1$, $\lambda_2$, $\lambda_3$ have the relations of $\lambda_1>\lambda_2>\lambda_3$ herein, and $N_1$, $N_2$, $N_3$ are refractive indexes corresponding to each wavelength $\lambda_1$, $\lambda_2$, $\lambda_3$. For instance, while the Abbe constant of BK7 glass for normal use is $v_d=64.1$, the Abbe constant of a DOE is $v_d=-3.45$. Thus, a DOE has much greater dispersion than a glass lens (i.e., more than one order of magnitude) and, in addition, its sign is also different.

Therefore, by applying the dispersion characteristics of the DOE on an aspherical surface, lateral color can be favorably corrected even with a small number of lens elements, such as two. Also, there will be fewer limitations on dispersion relating to the types of nitric material used. Thus, the number of acceptable types will increase, so that a nitric material can be used that has a refractive index so as to reduce the Petzval sum, while at the same time sufficiently correcting the curvature of field. Since both the lateral color and the curvature of field can be favorably corrected, the imaging properties of the image-reading lens are unlikely to degrade even when broadband radiation is used as the light source.

Moreover, in Embodiment 1, the second lens element $L_2$ is made of plastic. With the use of a plastic material to make this lens element, the material workability for crafting the lens is improved and thus the cost of manufacture is reduced. As a result of these advantages, it is desirable to form the DOE on the aspherical surface of a plastic lens element rather than on the surface of a non-plastic material such as glass.

Furthermore, the lens element made of a non-plastic material (i.e., the first lens element $L_1$ in Embodiment 1), has a focal length fa, as compared with the focal length of the image-reading lens, within the range specified by Condition (1). The power of each lens element is thus distributed, allowing the refractive power of the plastic lens element to be reduced. By reducing the refractive power of the plastic lens element, the temperature dependency of the plastic lens element can be lowered, so that the deterioration of the image-reading lens due to temperature fluctuations can be reduced. In addition, the image-side surface of the second lens element $L_2$ is made to be aspherical, and this enables the aberrations to be more favorably corrected. Of course, plastic is also superior for ease of lens crafting the aspherical surface.

Table 1 shows the surface number # of each surface, in order from the object side, the radius of curvature R (in mm) of each surface, the axial spacing D (in mm) of each surface, as well as the refractive index $N_d$ and an Abbe constant $v_d$ (at the d line) of each lens element of Embodiment 1. In the bottom portion of the table is listed the f-number $F_{NO.}$, the focal length f(in mm) of the image-reading lens, the magnification $\beta$, the half-field angle $\omega$, and the value of the ratio listed in Condition (1), which in this case corresponds to $f/f_1$, since the first lens element in this embodiment is made of non-plastic material Thus, the image-reading lens of this embodiment satisfies Condition (1).

TABLE 1

| # | R | D | $N_d$ | $v_d$ |
|---|---|---|---|---|
| 1 | 5.9644 | 4.05734 | 1.590044 | 61.1 |
| 2 | 8.6991 | 0.50000 | | |
| 3 (diaphragm) | ∞ | 3.04028 | | |
| 4 (diffractive/aspherical surface) | −7.9355 | 4.30030 | 1.526280 | 56.0 |
| 5 (aspherical surface) | −9.6279 | 1.00000 | | |
| 6 | ∞ | 0.70000 | 1.517564 | 64.0 |
| 7 | ∞ | | | |

$F_{NO.}$ = 5.0   f = 24.9   $\beta$ = −0.112   $\omega$ = 23.6°
$f/f_1$ = 1.20

In Table 2, each constant of the diffractive/aspherical surface and the aspherical surface expressed by the above-mentioned equations of zone plate zone depth and aspheric surface shape is listed for Embodiment 1.

TABLE 2

Diffractive/Aspherical Optical Surface ($4^{th}$ Surface)

| Coefficients of the Asphere | Coefficients of the Phase Function |
|---|---|
| K = 5.6774509 | $B_1$ = −2.4000063 |
| $A_4$ = −8.2706275 × $10^{-4}$ | $B_2$ = 8.1921303 × $10^{-3}$ |
| $A_6$ = −2.6464975 × $10^{-5}$ | $B_3$ = 1.2141895 × $10^{-7}$ |
| $A_8$ = −8.9304169 × $10^{-6}$ | $B_4$ = 5.9100178 × $10^{-8}$ |
| $A_{10}$ = −3.0405432 × $10^{-9}$ | $B_5$ = 8.2275134 × $10^{-11}$ |

Aspherical Optical Surface ($5^{th}$ Surface)

Coefficients of the Asphere

K = 0.9565079
$A_4$ = −4.935294 × $10^{-3}$
$A_6$ = 1.171728 × $10^{-4}$
$A_8$ = 6.191677 × $10^{-7}$
$A_{10}$ = −1.732433 × $10^{-7}$

FIGS. 2A–2D show the spherical aberration, astigmatism, distortion and lateral color of the image-reading lens of Embodiment 1. In addition, ω in this and the following figures indicates the half-field angle. As shown in FIGS. 2A–2D and Table 1, Embodiment 1 satisfies Condition (1), and provides an image-reading lens that favorably corrects both the lateral color and curvature of field using only two lens elements. Further, this embodiment has only a small sensitvty to temperature variations.

Embodiment 2

The image-reading lens of Embodiment 2 is roughly the same as in Embodiment 1, but is different in that the surface of the second lens element $L_2$ at the object side is aspherical and the surface at the image side is a zone plate diffractive/aspherical surface.

Table 3 shows the surface number # of each surface, in order from the object side, the radius of curvature R (in mm) of each surface, the axial spacing D (in mm) of each surface, as well as the refractive index $N_d$ and an Abbe constant $v_d$ (at the d line) of each lens element of Embodiment 2. In the bottom portion of the table is listed the f-number $F_{NO.}$, the focal length f (in mm) of the image-reading lens, the magnification β, the half-field angle ω, and the value of the ratio listed in Condition (1), which in this case corresponds to f/$f_1$, since the first lens element in this embodiment is made of non-plastic material. Thus, the image-reading lens of this embodiment satisfies Condition (1).

TABLE 3

| # | R | D | $N_d$ | $v_d$ |
|---|---|---|---|---|
| 1 | 6.1598 | 4.70056 | 1.590044 | 61.1 |
| 2 | 8.5606 | 0.51827 | | |
| 3 diaphragm | ∞ | 2.61000 | | |
| 4 (aspherical surface) | −8.5847 | 4.42343 | 1.526280 | 56.0 |
| 5 (diffractive/aspherical surface) | −9.7408 | 1.00000 | | |
| 6 | ∞ | 0.70000 | 1.517564 | 64.0 |
| 7 | ∞ | | | |

$F_{NO.}$ = 5.0   f = 24.9   β = −0.112   ω = 23.6°
f/$f_1$ = 1.15

In Table 4, each constant of the diffractive/aspherical surface and the aspherical surface expressed by the above-mentioned equations of zone plate zone depth and aspheric surface shape is listed for Embodiment 2.

TABLE 4

Aspherical Optical Surface ($4^{th}$ Surface)

Coefficients of the Asphere
K = 6.6824224
$A_4$ = −8.409953 × $10^{-4}$
$A_6$ = −2.655324 × $10^{-5}$
$A_8$ = −8.930424 × $10^{-6}$
$A_{10}$ = −3.143947 × $10^{-9}$ Diffractive/Aspherical Optical Surface ($5^{th}$ Surface)

| Coefficients of the Asphere | Coefficients of the Phase Function |
|---|---|
| K = 0.9176783 | $B_1$ = 2.4000029 |
| $A_4$ = −5.0445339 × $10^{-3}$ | $B_2$ = −1.0230426 × $10^{-3}$ |
| $A_6$ = −1.0803069 × $10^{-4}$ | $B_3$ = 2.0723266 × $10^{-6}$ |
| $A_8$ = 4.9317437 × $10^{-7}$ | $B_4$ = −5.7325854 × $10^{-9}$ |
| $A_{10}$ = −1.7600483 × $10^{-7}$ | $B_5$ = 2.2811790 × $10^{-11}$ |

FIGS. 3A–3D show the spherical aberration, astigmatism, distortion and lateral color respectively of the image-reading lens of Embodiment 2. As shown in Table 3 and FIGS. 3A–3D, Embodiment 2 satisfies Condition (1), and provides an image-reading lens that favorably corrects both the lateral color and curvature of field using only two lens elements. Further, this embodiment has only a small sensitivity to temperature variations.

Embodiment 3

The image-reading lens of Embodiment 3 comprises a negative meniscus first lens element $L_1$ and a positive meniscus second lens element $L_2$. The first lens element L, is made of plastic, the surface at the object side thereof is a zone plate diffractive/aspherical optical surface, and the surface at the image side is aspherical Moreover, the shapes of the zone plate diffractive/aspherical optical surface and the aspherical surface of the first lens element $L_1$ are expressed by the same equations as in Embodiment 1.

In addition, the image-reading lens of Embodiment 3 satisfies Condition (1), above. Even in this embodiment, the operational effects of using a zone plate diffractive/aspherical optical surface, and an aspherical surface on opposite side of a plastic lens element are the same as in Embodiment 1.

Table 5 shows the surface number # of each surface, in order from the object side, the radius of curvature R (in mm) of each surface, the axial spacing D (in mm) of each surface, as well as the refractive index $N_d$ and an Abbe constant $v_d$ (at the d line) of each lens element of Embodiment 3. In the bottom portion of the table is listed the f-number $F_{NO.}$, the focal length (in mm) of the image-reading lens, the magnification β, the half-field angle ω, and the value of the ratio listed in Condition (1), which in this case corresponds to f/$f_2$, since the second lens element in this embodiment is made of non-plastic material Thus, the image-reading lens of this embodiment satisfies Condition (1).

TABLE 5

| # | R | D | $N_d$ | $v_d$ |
|---|---|---|---|---|
| 1 (diffractive/aspherical surface) | 5.0819 | 4.50000 | 1.526280 | 56.0 |
| 2 (aspherical surface) | 4.3389 | 2.19859 | | |
| 3 (diaphragm) | ∞ | 4.00000 | | |
| 4 | −9.6725 | 3.72345 | 1.583130 | 59.4 |
| 5 | −6.8699 | 1.00000 | | |
| 6 | ∞ | 0.70000 | 1.517564 | 64.0 |
| 7 | ∞ | | | |

$F_{NO.}$ = 5.0   f = 25.5   β = −0.112   ω = 23.1°
f/$f_2$ = 1.02

In Table 6, each constant of the zone plate diffractive/aspherical surface and the aspherical surface expressed by the above-mentioned equations of zone plate zone depth and aspheric surface shape is listed for Embodiment 3.

TABLE 6

Diffractive/Aspherical Optical Surface (1st Surface)

| Coefficients of the Asphere | Coefficients of the Phase Function |
|---|---|
| $K = 1.1376157$ | $B_1 = -7.9999955$ |
| $A_4 = -3.6011106 \times 10^{-5}$ | $B_2 = -1.5359849 \times 10^{-2}$ |
| $A_6 = -8.1046660 \times 10^{-7}$ | $B_3 = -4.6547564 \times 10^{-9}$ |
| $A_8 = -3.2032154 \times 10^{-8}$ | $B_4 = -3.0026379 \times 10^{-10}$ |
| $A_{10} = -4.3336811 \times 10^{-10}$ | $B_5 = -1.2921325 \times 10^{-11}$ |

Aspherical Surface (2nd Surface)

Coefficients of the Asphere $K = 2.4774910$
$A_4 = -4.381800 \times 10^{-4}$
$A_6 = 5.878258 \times 10^{-6}$
$A_8 = 1.140702 \times 10^{-8}$
$A_{10} = 2.098834 \times 10^{-10}$ FIGS. 4A–4D show the spherical aberration, astigmatism, distortion and lateral color of respectively the image-reading lens of Embodiment 3.

As shown in Table 5 and FIGS. 4A–4D, Embodiment 3 satisfies Condition (1), and provides an image-reading lens that favorably corrects both the lateral color and curvature of field using only two lens elements. Further, this embodiment has only a small sensitivity to temperature variations.

Embodiment 4

The image-reading lens of Embodiment 4 is roughly the same as in Embodiment 3, but is different in that the surface of the first lens element $L_1$ at the object side is aspherical and the aspherical surface at the image side is a zone plate diffractive/aspherical optical surface.

Table 7 shows the surface number # of each surface, in order from the object side, the radius of curvature R (in mm) of each surface, the axial spacing D (in mm) of each surface, as well as the refractive index $N_d$ and an Abbe constant $v_d$ (at the d line) of each lens element of Embodiment 4. In the bottom portion of the table is listed the f-number $F_{NO.}$, the focal length f(in mm) of the image-reading lens, the magnification $\beta$, the half-field angle $\omega$, and the value of the ratio listed in Condition (1), which in this case corresponds to $f/f_2$, since the second lens element in this embodiment is made of non-plastic material. Thus, the image-reading lens of this embodiment satisfies Condition (1).

TABLE 7

| # | R | D | $N_d$ | $v_d$ |
|---|---|---|---|---|
| 1 (aspherical surface) | 5.4544 | 4.49997 | 1.526280 | 56.0 |
| 2 (diffractive/aspherical surface) | 4.6089 | 2.80413 | | |
| 3 (diaphragm) | ∞ | 4.00002 | | |
| 4 | −10.5217 | 3.15904 | 1.713000 | 53.9 |
| 5 | −7.3078 | 1.00000 | | |
| 6 | ∞ | 0.70000 | 1.517564 | 64.0 |
| 7 | ∞ | | | |

$F_{NO.} = 5.0 \quad f = 25.4 \quad \beta = -0.112 \quad \omega = 23.2°$
$f/f_2 = 1.08$ In Table 8, each constant of the zone plate diffractive/aspherical surface and the aspherical surface expressed by the above-mentioned equations of zone plate zone depth and aspheric surface shape is listed for Embodiment 4.

TABLE 8

Aspherical Surface (1st Surface)

Coefficients of the Asphere
$K = 1.1716661$
$A_4 = -2.845409 \times 10^{-5}$
$A_6 = -3.015887 \times 10^{-7}$
$A_8 = -1.084306 \times 10^{-8}$
$A_{10} = -2.254612 \times 10^{-10}$ Diffractive/Aspherical Optical Surface (2nd Surface)

| Coefficients of the Asphere | Coefficients of the Phase Function |
|---|---|
| $K = 2.3520290$ | $B_1 = -15.520001$ |
| $A_4 = -2.9024227 \times 10^{-4}$ | $B_2 = -1.7152000 \times 10^{-2}$ |
| $A_6 = -7.4904630 \times 10^{-7}$ | $B_3 = 8.0440285 \times 10^{-10}$ |
| $A_8 = -1.5292866 \times 10^{-9}$ | $B_4 = 4.4067928 \times 10^{-11}$ |
| $A_{10} = 3.6174957 \times 10^{-10}$ | $B_5 = 1.4317112 \times 10^{-12}$ |

FIGS. 5A–5D show the spherical aberration, astigmatism, distortion and lateral color respectively of the image-reading lens of Embodiment 4.

As shown in Table 7 and FIGS. 5A–5D, this Embodiment 4 satisfies Condition (1), and provides an image-reading lens that favorably corrects both the lateral color and curvature of field using only two lens elements. Further, this embodiment has only a small sensitivity to temperature variations.

Embodiment 5

Figure 6:
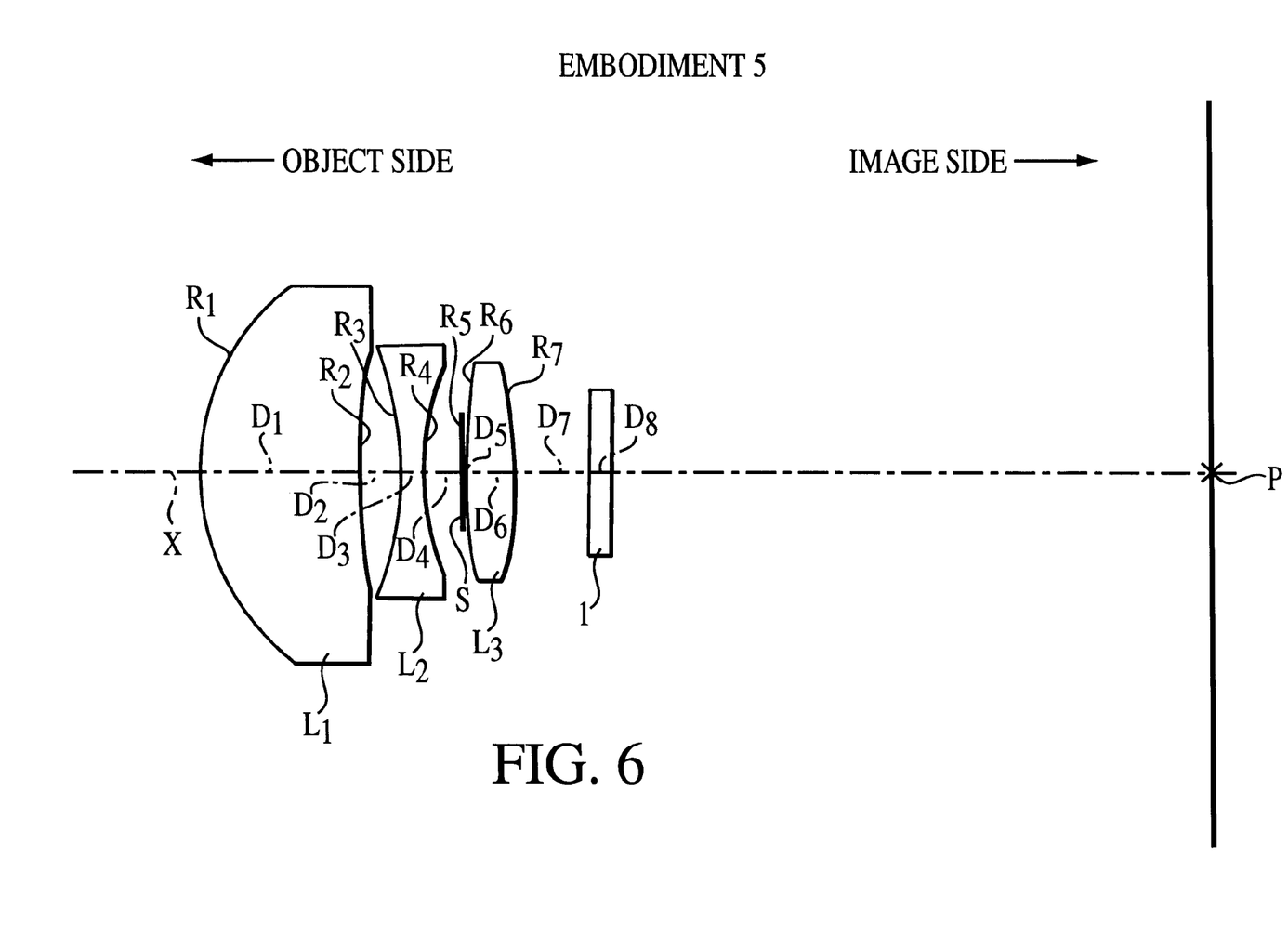
FIG. 6 shows the basic lens element configuration of the image-reading lens of Embodiment 5, and, FIGS. 7A–7D show various aberration curves of the image-reading lens of Embodiment 5.
Figure 7A:
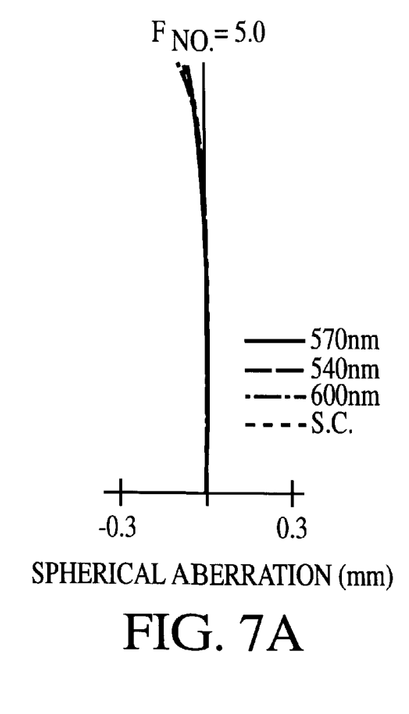
Figure 7B:
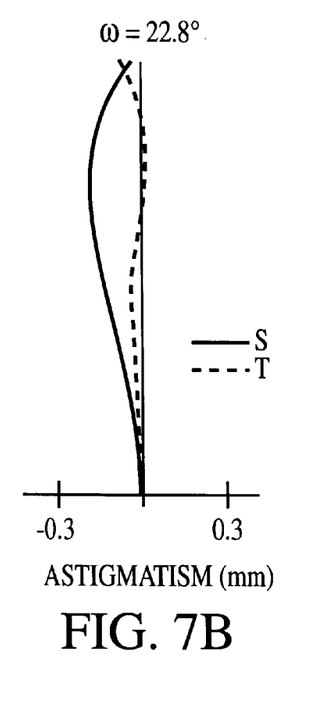
Figure 7C:
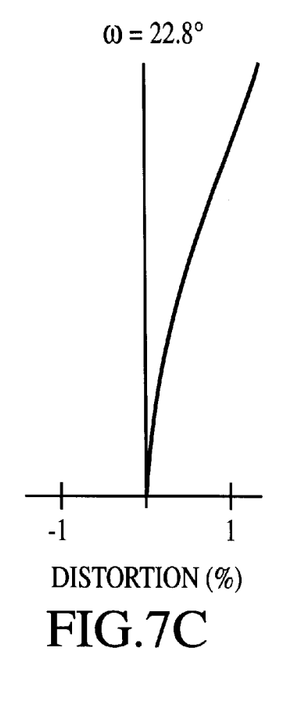
Figure 7D:
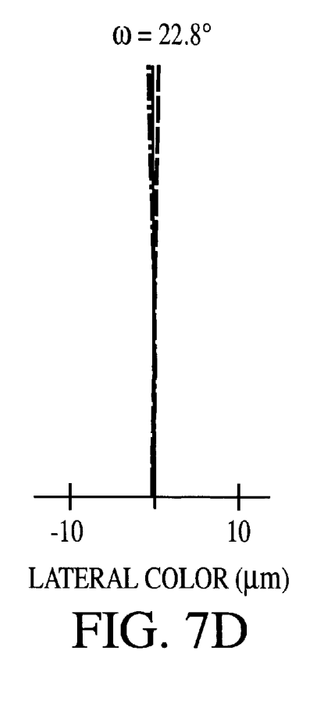

FIG. 6 shows the basic lens element configuration of Embodiment 5 of the present invention. As shown in FIG. 6, the image-reading lens relating to Embodiment 5 comprises, in succession from the object side, a positive meniscus first lens element $L_1$ having its convex surface at the object side, a biconvex second lens element $L_2$ with a surface of larger radius of curvature on the object side, and a biconvex third lens element $L_3$ with a surface of larger radius of curvature on the object side.

The first lens element $L_1$ is made of plastic, its surface on the object side is aspherical, and its surface on the image side is a zone plate diffractive/aspherical optical surface. Also, a diaphragm S is arranged between the second lens element $L_2$ and the third lens element $L_3$, and a cover glass 1 is arranged at the image plane side of the third lens element $L_3$. Moreover, X indicates an optical axis in FIG. 6.

Furthermore, the shapes of the zone plate diffractive/aspherical optical surface and the aspherical optical surface of the first lens element $L_2$ are expressed by the same equations as in the above-noted Embodiment 1.

Even in Embodiment 5, the operational effects are roughly the same as in Embodiment 1. In other words, by using a zone plate diffractive/aspherical optical surface, lateral color as well as curvature of field can be favorably corrected even with a small number of lens elements (in this case, three), using a light and inexpensive plastic lens element to which an aspheric surface may be applied to its opposite surface to achieve high optical performance.

Table 9 shows the surface number # of each surface, in order from the object side, the radius of curvature R (in mm) of each surface, the axial spacing D (in mm) of each surface, as well as the refractive index $N_d$ and an Abbe constant $v_d$ (at the d line) of each lens element of Embodiment 5. In the bottom portion of the table is listed the f-number $F_{NO.}$, the focal length f(in mm) of the image-reading lens, the magnification $\beta$, the half-field angle $\omega$, and the value of the ratio listed in Condition (1), which in this case corresponds to $f/f_2$, since the second lens element in this embodiment is made of non-plastic material. Thus, the image-reading lens of this embodiment satisfies Condition (1).

TABLE 9

| # | R | D | $N_d$ | $v_d$ |
|---|---|---|---|---|
| 1 (aspherical surface) | 8.4962 | 5.00000 | 1.526280 | 56.0 |
| 2 (diffractive optical surface) | 53.9707 | 1.14114 | | |
| 3 | −10.8300 | 0.66000 | 1.548140 | 45.9 |
| 4 | 10.4907 | 1.20000 | | |
| 5 (diaphragm) | ∞ | 0.12000 | | |
| 6 | 34.3357 | 1.50000 | 1.772500 | 49.6 |
| 7 | −13.8522 | 1.00000 | | |
| 8 | ∞ | 0.70000 | 1.517564 | 64.0 |
| 9 | ∞ | | | |

$F_{NO.} = 5.0$   $f = 24.9$   $\beta = -0.112$   $\omega = 22.8°$

In Table 10, each constant of the zone plate diffractive/aspherical surface and the aspherical surface expressed by the above-mentioned equations of zone plate zone depth and aspherical surface shape is listed for Embodiment 5.

TABLE 10

Aspherical Surface (1st Surface)

Coefficients of the Asphere
$K = 1.17215168$
$A_4 = -8.449124 \times 10^{-5}$
$A_6 = -1.263337 \times 10^{-6}$
$A_8 = -2.531173 \times 10^{-9}$
$A_{10} = -1.194923 \times 10^{-10}$ Diffractive/Aspherical Optical Surface (2nd Surface)

| Coefficients of the Asphere | Coefficients of the Phase Function |
|---|---|
| $K = 1.1459374$ | $B_1 = -16.000003$ |
| $A_4 = 1.6999606 \times 10^{-4}$ | $B_2 = -1.2799997 \times 10^{-2}$ |
| $A_6 = -9.0344806 \times 10^{-7}$ | $B_3 = 4.0960001 \times 10^{-4}$ |
| $A_8 = -1.4774133 \times 10^{-9}$ | $B_4 = -3.9321541 \times 10^{-8}$ |
| $A_{10} = -1.0329395 \times 10^{-11}$ | $B_5 = -1.0485726 \times 10^{-9}$ |

FIGS. 7A–7D show the spherical aberration, astigmatism, distortion and lateral color respectively of the image-reading lens of Embodiment 5. As shown in FIGS. 7A–7D, Embodiment 5 favorably corrects each of the various aberrations including both lateral color and curvature of field using only three lens elements. Further, this embodiment has only a small sensitivity to temperature variations.

As explained above, according to the image-reading lens of the present invention, by applying a DOE to an aspherical surface, both lateral color and curvature of field can be simultaneously suppressed while employing only two or three lens elements. Furthermore, the image reader lens has only a small temperature dependency despite one or more of its lens elements being formed of plastic. The image reader lens is light weight, inexpensive to produce, and can be used to image polychromatic light onto a detector surface.

The invention being thus described, it will be obvious that the same may be varied in many ways. For example, the radii of curvature R and the surface spacings D can be appropriately scaled to achieve an image-reading lens of a different focal length. Such variations are not to be regarded as a departure from the spirit and scope of the invention. Rather the scope of the invention shall defined as set forth in the following claims and their legal equivalents. All such modifications as would be obvious to one skilled in the art are intended to be included within the scope of the following claims.

What is claimed is:

1. An image-reading lens having only two lens elements of refractive power, said image-reading lens comprising:

a lens element of meniscus shape having its convex surface forming the most object-side lens element surface of the image-reading lens; and a lens element of meniscus shape having its convex surface forming the most image-side lens element surface of the image-reading lens; wherein at least one surface of the two lens elements of meniscus shape is aspherical and includes a zone plate diffractive surface having different depth zones surrounding a vertex, said zone plate diffractive surface providing a color dispersion function which exceeds that of a refractive glass a surface.

2. The image-reading lens of claim 1, wherein one of the two lens elements of meniscus shape is made of plastic material, and the other of the two lens elements of meniscus shape is made of non-plastic material.

3. The image-reading lens of claim 2, wherein the following condition is satisfied $0.7 < f/fa < 1.3$ where f is the focal length of the image-reading lens, and fa is the focal length of the lens element made of non-plastic material.

4. The image-reading lens of claim 1, wherein the opposite surface of the lens element having said zone plate diffractive surface formed thereon is aspherical.

5. The image-reading lens of claim 2, wherein the zone plate diffractive/aspherical surface is provided on the lens element made of plastic material.

6. An image-reading lens having only three lens elements with refractive power, said image-reading lens comprising:

a first lens element of meniscus shape having its convex surface forming the most object-side lens element surface of the image-reading lens, a second lens element of negative refractive power positioned adjacent the first lens element; and a third lens element of meniscus shape having its convex surface forming the most image-side lens element surface of the image-reading lens, wherein one surface of said first lens element or said third lens element is aspherical and includes a zone plate diffractive optical surface having different depth zones surrounding a vertex, said zone plate diffractive optical surface providing a color dispersion function which exceeds that of a refractive glass surface.

7. The image-reading lens of claim 6, wherein the other surface of said lens element which includes a zone plate diffractive optical surface on one side thereof is aspherical in shape.

8. The image-reading lens of claim 7, wherein the zone plate diffractive/aspherical surface and the aspherical surface are formed on opposite sources of a lens element that is made of plastic material.

* * * * *

UNITED STATES PATENT AND TRADEMARK OFFICE
CERTIFICATE OF CORRECTION

PATENT NO : 6,147,816
DATED : Nov. 14, 2000
INVENTOR(S): Ori

It is certified that error appears in the above-identified patent and that said Letters Patent are hereby corrected as shown below:

In the left column of the cover page, please add the following below "References Cited" and below "U.S. Patent Documents":
- -5,680,252 10/1997 Sitter, Jr. et al - - ;

In column 1, line 39, change "win" to - -will - -;

In column 3, line 12, change "material A" to - -material. A- -

In column 3, line 19, change "(ie.," to - - (i.e., - -

In column 3, line 46, change "(ie.," to - - (i.e., --

Signed and Sealed this

Twenty-ninth Day of May, 2001

Attest:

NICHOLAS P. GODICI

*Attesting Officer*    *Acting Director of the United States Patent and Trademark Office*